US011782511B2

(12) United States Patent
Miller

(10) Patent No.: US 11,782,511 B2
(45) Date of Patent: *Oct. 10, 2023

(54) TACTILE GLOVE FOR HUMAN-COMPUTER INTERACTION

(71) Applicant: Magic Leap, Inc., Plantation, FL (US)

(72) Inventor: Samuel A. Miller, Hollywood, FL (US)

(73) Assignee: Magic Leap, Inc., Plantation, FL (US)

(\*) Notice: Subject to any disclaimer, the term of this patent is extended or adjusted under 35 U.S.C. 154(b) by 511 days.

This patent is subject to a terminal disclaimer.

(21) Appl. No.: 16/934,387

(22) Filed: Jul. 21, 2020

(65) Prior Publication Data

US 2020/0348760 A1  Nov. 5, 2020

Related U.S. Application Data

(63) Continuation of application No. 13/633,113, filed on Oct. 1, 2012, now Pat. No. 10,795,448.

(60) Provisional application No. 61/540,685, filed on Sep. 29, 2011.

(51) Int. Cl.
*G06F 3/047* (2006.01)
*G06F 3/01* (2006.01)

(52) U.S. Cl.
CPC .............. *G06F 3/017* (2013.01); *G06F 3/014* (2013.01); *G06F 3/047* (2013.01)

(58) Field of Classification Search
None
See application file for complete search history.

(56) References Cited

U.S. PATENT DOCUMENTS

| 4,659,873 | A | 4/1987 | Gibson et al. |
| 6,128,004 | A | 10/2000 | McDowall et al. |
| 6,239,784 | B1 | 5/2001 | Holmes |
| 7,109,970 | B1 | 6/2006 | Miller |
| 10,795,448 | B2 * | 10/2020 | Miller .................. G06F 3/014 |
| 2005/0200602 | A1 | 9/2005 | Laurell |
| 2007/0257890 | A1 | 11/2007 | Hotelling et al. |

(Continued)

FOREIGN PATENT DOCUMENTS

GB    2286035    8/1995

OTHER PUBLICATIONS

Final Office Action for U.S. Appl. No. 13/633,113 dated Feb. 8, 2019.

(Continued)

*Primary Examiner* — Carl Adams
(74) *Attorney, Agent, or Firm* — Vista IP Law Group, LLP

(57) ABSTRACT

One embodiment is directed to a system for human-computer interface, comprising an input device configured to provide two or more dimensions of operational input to a processor based at least in part upon a rubbing contact pattern between two or more digits of the same human hand that is interpreted by the input device. The input device may be configured to provide two orthogonal dimensions of operational input pertinent to a three-dimensional virtual environment presented, at least in part, by the processor. The input device may be configured to detect the rubbing between a specific digit in a pen-like function against one or more other digits. The input device further may be configured to detect the rubbing between the specific digit in a pen-like function and one or more other digits in a receiving panel function.

20 Claims, 13 Drawing Sheets

(56) References Cited

U.S. PATENT DOCUMENTS

| | | |
|---|---|---|
| 2008/0050550 A1 | 2/2008 | Orth |
| 2009/0231275 A1 | 9/2009 | Odgers |
| 2009/0322685 A1 | 12/2009 | Moon |
| 2011/0032215 A1 | 2/2011 | Sirotich et al. |
| 2011/0118753 A1 | 5/2011 | Itkowitz et al. |
| 2011/0205081 A1 | 8/2011 | Chen et al. |
| 2011/0261007 A1 | 10/2011 | Joharapurkar et al. |
| 2011/0277215 A1 | 11/2011 | Lee et al. |
| 2011/0279397 A1 | 11/2011 | Rimon et al. |
| 2012/0050164 A1 | 3/2012 | Martel |
| 2012/0056805 A1* | 3/2012 | Bronner, Sr. ............ G06F 3/014 345/157 |
| 2012/0262369 A1 | 10/2012 | Griffin |

OTHER PUBLICATIONS

Final Office Action for U.S. Appl. No. 13/633,113 dated Nov. 24, 2017.
Final Office Action for U.S. Appl. No. 13/633,113 dated Jun. 14, 2017.
Final Office Action for U.S. Appl. No. 13/633,113 dated Jul. 1, 2016.
Final Office Action for U.S. Appl. No. 13/633,113 dated Jan. 5, 2015.
Non-Final Office Action for U.S. Appl. No. 13/633,113 dated Nov. 25, 2019.
Non-Final Office Action for U.S. Appl. No. 13/633,113 dated Jul. 23, 2018.
Non-Final Office Action for U.S. Appl. No. 13/633,113 dated Feb. 27, 2017.
Non-Final Office Action for U.S. Appl. No. 13/633,113 dated Jul. 29, 2015.
Non-Final Office Action for U.S. Appl. No. 13/633,113 dated Mar. 17, 2014.
Amendment Response to NFOA for U.S. Appl. No. 13/633,113 dated Mar. 25, 2020.
Amendment Response to NFOA for U.S. Appl. No. 13/633,113 dated Oct. 23, 2018.
Amendment Response to NFOA for U.S. Appl. No. 13/633,113 dated May 25, 2017.
Amendment Response to NFOA for U.S. Appl. No. 13/633,113 dated Jan. 28, 2016.
Amendment Response to NFOA for U.S. Appl. No. 13/633,113 dated Sep. 17, 2014.
Amendment Response to FOA for U.S. Appl. No. 13/633,113 dated Mar. 29, 2018.
Amendment Response to FOA for U.S. Appl. No. 13/633,113 dated Aug. 31, 2020.
Amendment Response to FOA for U.S. Appl. No. 13/633,113 dated Jul. 6, 2015.
Amendment Response to FOA for U.S. Appl. No. 13/633,113 dated Dec. 28, 2016.
Amendment Response to FOA for U.S. Appl. No. 13/633,113 dated Sep. 7, 2017.
Amendment Response to FOA for U.S. Appl. No. 13/633,113 dated Aug. 8, 2019.
Notice of Allowance for U.S. Appl. No. 13/633,113 dated Apr. 28, 2020.
Miller, et al., "A glove for rubbing and touch gestures," retrieved from the internet: https//pdfs.semanticscholar.org/04d2/a1f9fc70bbf2960e94c2448f25c8e9bc2d8d.pdf, Jul. 12, 2011.
Communication Pursuant to Article 94(3) EPC dated Dec. 27, 2017, European Patent Application No. 12835938.7 (7 pages).
Extended European Search Report dated May 12, 2015, European Patent Application No. 12835938.7, (7pages).

* cited by examiner

1. Audio queue, "Crawler: I am stuck, please assist."
2. User taps tips of all fingers together to bring up augmented reality view.
3. A diagnostic window appears, semi-transparent in upper corner of HMD, giving a brief status overview.
4. Three taps on ring finger transition HMD to opaque, and shows the crawlers control interface.
5. A down-and-left stroke of the thumb on the index and middle finger focus the "Behaviors box.
6. A tap of the thumb and ring finger enter the behaviors box.
7. Sliding the thumb across the index finger, the user scrolls to the "manual drive" behavior.
8. A tap of thumb and little finger pops out of the behaviors box, putting the robot in the just-selected behavior.
9. An up-and-left stroke of thumb against index and middle finger highlights the drive button.
10. A tap of the thumb and ring finger starts manual drive.
11. The thumb's motion on the 2D touchpad formed by the index and middle fingers acts as a joystick, driving the robot.
12. When robot is "unstuck," user performs repeats the above steps to put the crawler into a behavior, then taps all the tips of his fingers together twice to return to augmented reality mode, and turn off the HMD.

*FIG. 13*

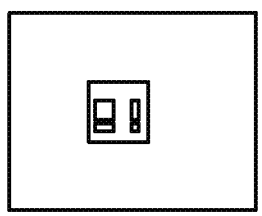
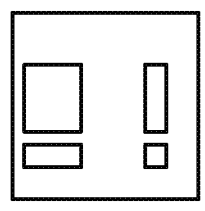
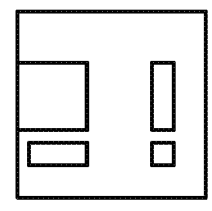
FIG. 15A   FIG. 15B   FIG. 15C
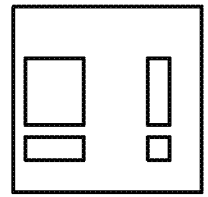
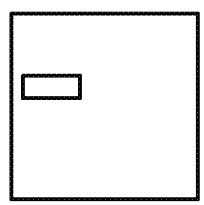
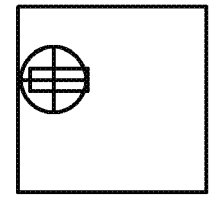
FIG. 15D   FIG. 15E   FIG. 15F

TACTILE GLOVE FOR HUMAN-COMPUTER INTERACTION

CROSS-REFERENCE TO RELATED APPLICATIONS

The present application is a continuation of U.S. patent application Ser. No. 13/633,113, filed on Oct. 1, 2012, entitled "TACTILE GLOVE FOR HUMAN-COMPUTER INTERACTION", which claims priority to U.S. Provisional Application Ser. No. 61/540,685, filed on Sep. 29, 2011. The foregoing applications are hereby incorporated by reference into the present application in their entirety.

FIELD OF THE INVENTION

The present invention relates generally to master input device configurations for interacting with computers and computerized systems, and more particularly to tactile glove configurations designed to measure contact between and among the fingers of the hand, and use that information as control input for computer systems.

BACKGROUND

Interacting with a computer may be challenging when an operator is moving in natural environments (e.g. walking, driving, fishing, etc.) and there is a need for improved solutions to this and other computer interface challenges. It would be valuable to have a more fluid interaction with the computer through tactile interactions among and between a user's fingers than is available today. In some scenarios, a view of a computer display is not always available. It would be valuable to have master input functionality in scenarios wherein an operator's hands are out of view (in pockets for instance). It would also be valuable to provide speed and efficiency in the computer interaction. Given the range and variation of motions typically encountered at the hand, the hand is a challenging mounting location for interface devices.

Research on conductive and "smart" fabrics for human-computer-interaction (or "HCI") goes back over a decade. In recent years it has become relatively easy to develop and experiment with different uses of the technology. Beyond the basic medium of conductive threads and fabric, the glove draws on two main areas of work: glove-based interaction and the use of proprioception in input devices.

Dipietro et al. extensively survey the literature of glove-based interaction, including glove characteristics, application areas, and advantages/disadvantages. None of the 32 gloves surveyed has the combination of interaction properties of our glove; we believe that low-resolution spatial input by open-loop gestures is unique in glove-based interaction. The most similar device in the literature is the chording glove, which includes fingertip sensors and three discrete switches along the index finger. The input device taxonomy of Card et al. shows a scale for the resolution of input information via linear devices (e.g., the mouse), but almost all linear devices (excepting menus) provide "infinite" resolution in multiple dimensions (i.e., input that matches the high resolution of a display device). Ordinarily we would not see reduced resolution as an advantage in an input device. In the case of our glove, research in this direction is driven by two factors. First, low resolution facilitates a relatively natural interaction technique by exploiting proprioception. Second, conventional technology for high-resolution touch devices does not lend itself to this style of interaction, whereas low-resolution fabric-based technology does.

Proprioception can be an important factor in non-spatial input (e.g., in touch typing) and in targeted movement tasks, in both the directional component (e.g., movement of a joystick in one of the cardinal directions) and the distance component. Proprioception has been applied directly in the development of some input techniques, though to different ends than with our glove. Mine et al. describe a framework for virtual reality systems in which a number of proprioception-based interaction techniques are introduced. De Boeck et al., also working in virtual reality, describe techniques for analyzing the integration of proprioceptive cues into a multimodal interaction. These techniques apply at the arm and body-scale, and they are not associated with tactile or haptic feedback.

A few projects described in the HCI literature are similar in spirit to our own, though they differ significantly in focus and scope. For example, Olwal et al. demonstrate the promise of rubbing and tapping gestures for precise selection tasks on mobile devices. Li et al.'s "SoundTouch" supports vibrotactile interaction in the form of taps and rubs, but for output rather than input. In addition to performance findings, Li et al. report that subjects find the sensations from the device to be similar to touches from other humans. Ni and Baudisch describe the evolution of mobile devices toward disappearance via miniaturization. They evaluate the use of touch and motion scanners for character entry and marking tasks. Some categories of user errors they observed, dealing with device alignment and detection range, may be reduced in our glove, though the glove may have other limitations.

There is also a long history of gloves for automated recognition of sign language (Ong and Ranganath give a relatively recent partial survey).

SUMMARY

One embodiment is directed to a system for human-computer interface, comprising: an input device configured to provide two or more dimensions of operational input to a processor based at least in part upon a rubbing contact pattern between two or more digits of the same human hand that is interpreted by the input device. The input device may be configured to provide two orthogonal dimensions of operational input pertinent to a three-dimensional virtual environment presented, at least in part, by the processor. The input device may be configured to detect the rubbing between a specific digit in a pen-like function against one or more other digits. The input device further may be configured to detect the rubbing between the specific digit in a pen-like function and one or more other digits in a receiving panel function. The input device may be configured to detect the rubbing between a thumb of an operator in a pen-like function against one or more other digits. The input device may be configured to detect the rubbing between a thumb of an operator in a pen-like function against an index finger of the same hand of the operator. The input device may be configured to detect the rubbing between a thumb of an operator in a pen-like function against adjacently-positioned index and middle fingers of the same hand of the operator. The input device may comprise a tactile-sensitive glove. The tactile-sensitive glove may comprise two or more conductive portions that are operatively coupled to the processor. A displayed version of the three-dimensional virtual environment may be rendered by a video device operatively coupled to the processor.

BRIEF DESCRIPTION OF THE DRAWINGS

FIG. 13 illustrates an outline of an interaction scenario in accordance with one variation of the subject glove.

FIGS. 15A-15F illustrate, respectively: an original image of noisy glove data (FIG. 15A); an up-sampled image using bi-linear interpolation (FIG. 15B); proper close (FIG. 15C); local average smoothing (FIG. 15D); exponential lookup table (FIG. 15E); and energy centroid computed (FIG. 15F).

DETAILED DESCRIPTION

Figure 1A:
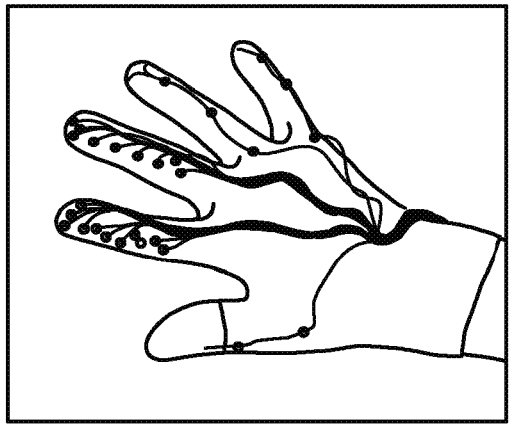
FIGS. 1A-1D illustrate images of a glove master input device variation in four different command configurations.

What is presented herein are various glove-based master input device configurations, wherein, amongst other factors, the glove differs from prior gloves because it explicitly measures the tactile interaction amongst and between the fingers of the associated human hand. Associated design and evaluation has been conducted with a glove instrumented with conductive threads and fabric. The glove contains large individual sensors covering the tips of the thumb, third, and fourth fingers; grids of smaller sensors line the palmar sides of the first and second fingers. The sensors of the first through fourth fingers are activated by contact with the thumb. Two types of gestures are supported: a touch contact between the thumb and the other fingers, and is fibbing gesture of the thumb on the first or second linger, or both together. Conceptually, the glove may be thought of as a low-resolution trackpad plus four buttons, all used by the thumb. FIGS. 1A-1D illustrate one glove configuration and various gestures it supports.

The glove shares some interaction properties with some other glove-based input techniques. No object is held in the hand, which facilitates switching to other kinds of tasks that require use of the hand, allowing for the physical dexterity constraints any glove imposes. Based on the taxonomic criteria of Dipietro et al., the glove can be described as follows: it relies on 1 cloth-supported discrete sensor on each of three fingers and >1 discrete sensors on two fingers, with 1-bit precision per sensor, and it is a tethered device (wireless is feasible but not currently implemented), communicating over a USB interface. The glove supports multiple-finger, surface-free input.

The glove integrates different interaction techniques in a novel way. First, input methods, including those associated with most types of gloves, are typically categorized as being continuous or discrete, with continuous input being used for spatial information in one, two, or three dimensions and discrete input for symbolic commands or characters. This distinction is not driven by physical or logical properties of interaction, but there are few common examples of linear input devices with an explicitly limited resolution used in computing today (e.g., such as a ratcheted physical slider). The glove provides spatial input, but at a much lower resolution than is typically associated with continuous input devices, and the sensors it relies on am simple discrete switches. Second, the glove exploits this low resolution input by allowing users to take advantage of proprioception, their implicit knowledge of locations on the fingers that can be touched by the thumb. Third, these touching actions are open-loop gestures that can be used for spatial targeting, which in most other input devices is supported by closed-loop gestures (e.g., targeting actions associated with pointer movements). These three interaction properties are not unique in isolation, but to our knowledge they have not been combined in a single input device.

The inventive glove consists of a set of digital and analog data channels in a combination of conductive thread and wire. The glove can be thought of as a set of switches, each of which completes a circuit through a variable resistor, which is an individual conductive thread. A switch is closed when the thumb makes contact with any thread. Current may be supplied by a model USB-6009 device supplied by National Instruments, Inc.

Figure 3:
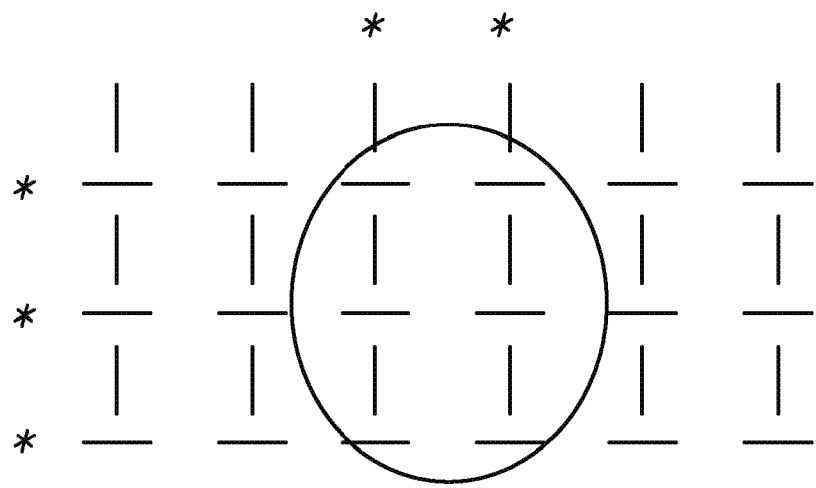
FIG. 3 illustrates various circuits actuated by a thumb on a variation of the subject glove.

The grid, divided into two even pans over the first and second fingers, provides 80 sensed locations in all: four threads running the length of each finger (the y threads), ten across the width (the x threads). The threads may be sewn in a crosshatch pattern on and below the surface of the glove fabric such that the threads do not touch each other, in particular at crossing points in the r and y dimensions. When the thumb touches the grid, it contacts at least one X and one p thread, closing those circuits. Each such event generates a bounding box (or a single point) on the grid, from which the center and the size of the box can be extracted, as shown in FIG. 3.

If the bounding box covers an odd number of grid lines in a given dimension, the center of the box corresponds to the center grid line in that dimension, if the bounding box covers an even number of grid lines, however, a point between the two center lines is used. This gives the grid an effective resolution of almost quadruple the number of its sensed locations with the qualifier being due to locations on the boundaries). This provides the intuition behind the glove's input processing. The actual implementation treats the grid as pixels of an image. Through multiple steps involving super resolution, look-up tables, and morphological reductions, the energy center of the touch "image" is extracted. These steps significantly reduce the noise inherent to the thumb/finger contact point, leverage the fact that the thumb contact area is usually quite large, and guarantee a single grid coordinate as the output value. This last point is notable as the grid intrinsically facilitates multi-touch interactions similar to those normally found in modern touch screens, but because the thumb is the only contact point with the grid, a single output is desirable.

Figure 4:
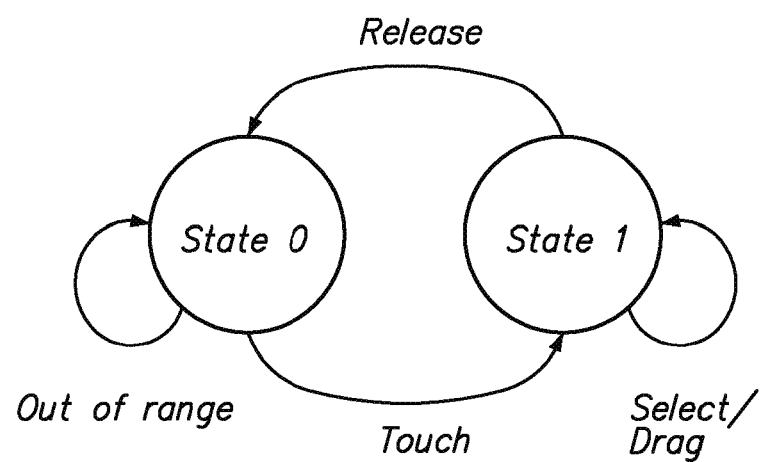
FIG. 4 illustrates a three-state model for a variation of the subject glove.

At an abstract level, the glove can be compared with other input devices in the form of a three-state model, as shown in FIG. 4. The size of the bounding box can be treated as further input, but we have not explored the use of this extra information in our work to date.

Implementation Example—Virtual Environment Simulation #1

Figure 2:
FIG. 2 illustrates robot views in a simulated or virtual 3-D environment.

One initial goal for the development of a suitable master input device glove was to support flexible one-handed interaction with a synthetic as might be provided in an augmented reality system (FIG. 2 illustrates robot views in a simulated or virtual 3-D environment), while the user is walking and looking around through a head-mounted display ("HMD"). We have developed a simulation of such an application using a video game engine. The simulation comprises two semi-autonomous robots (a "crawler" and a "flyer") that follow pre-programmed paths through a simulated rain forest environment. Each robot pipes its video feed and other status information to the user. The user can take control of either machine at any time to direct its actions using buttons, menus, and navigational controls.

The simulation may be operated using the glove as a master input device via different types of gestures:

Some global commands are mapped to taps on fingertips: a single tap on one or more fingers, or repeated taps on one or more fingers. The may be referred to as a "tap"

Some local or context-sensitive commands may be mapped to directional rubbing gestures, single strokes on the first or second finger, or across both. These can act as shortcuts to execute a command or change state in the interface (a "symbol rub" gesture).

Advancing down linear menus, a spatial command in one dimension may be mapped to a rubbing gesture on the first finger (a "scroll gesture"). This is distinguished from symbol rub gestures in that it involves targeting by distance as well as direction (scanning with the camera also may be implemented with this gesture in a different configuration)

Continuous, dynamic directions in two dimensions, analogous to the output of a joystick, are supported by rubbing over the first two fingers (a "2D rub gesture"). An analogous use of this gesture in the application is for choosing from a pie menu.

These gestures can be seen in a sample scenario in the simulation, in which the user responds to a call from the crawler that is stuck and needs assistance. The user executes the following steps, with the category of the relevant gesture that is bracketed.
1. Bring up a standard view on the HMD, including a diagnostic window. [Tap].
2. Switch to the crawler's control interface. [Tap].
3. Shift focus to the "Behaviors" menu. [2D rub].
4. Enter the "Behaviors" menu. [Tap].
5. Move through the items to highlight the "Manual" behavior. [Scroll].
6. Select the behavior. [Tap].
7. Switch focus to the "Drive" control. [2D rub].
8. Start manual drive. [Tap].
9. Drive the crawler until it is free. [2D rub].

Formative usability tests were conducted with six users. Each session began with a demonstration to show the different interaction options the glove supports. Within five minutes all users were reasonably competent in the interface, the only consistent challenge being the difficulty of remembering the mapping of different gestures to commands. Qualitative feedback was positive: Users found some kinds of gestures intuitive and enjoyable, in particular control of the movement of the robots by rubbing gestures.

A few initial lessons came to light during the formative evaluation. One is the potential difficulty for novice users to learn the mapping of gestures to commands in cases where there is no intuitively obvious choice, such as changing modes by tapping all fingers at once, (This was gesture was used to avoid accidental mode changes.) Another is the value of designing the layout of the interface such that, in specific modes, interface components can be selected by a short directional rub. This raises the issue, however, of whether strongly modal interfaces would be appropriate in other task domains.

The glove generally met our expectations in the application. It appears to show promise in offering an effective way to control a specific simulation, with some commands and continuous actions naturally mapping to the gestures supported by the device.

We carried out an informal evaluation to test the performance characteristics of the glove in tasks for which we expect it to be well suited. Our interest is in the following:

Target selection. Consider a scenario comparable to the one described in the previous section, in which the user would like to select a target region of a pre-specified size, perhaps indicated on a head-mourned display, using the glove. How accurately can the user perform such an action, either without visual feedback for the action or with adjustment based on feedback?

Fingertip tapping gestures. The glove supports discrete, non-spatial actions in the form of tapping the thumb to different fingers. How quickly and accurately can users carry out such actions.

Directional rubbing gestures for symbolic input. Directional rubbing gestures on the glove can interpreted as discrete symbols. How quickly and accurately can users cant' out sequences of such actions.

The goal of our evaluation was to develop a set of quantitative performance benchmarks for the use of the glove under laboratory conditions, mainly in the form of descriptive statistics.

Tasks were designed to answer the questions above, and a testing environment was created for each, with parameters selected based on a pilot study with the one of the authors acting as a participant.

We discovered that we had underestimated the noisiness of the prototype as an input device, due to its physical construction, its sensor limitations, and our input processing techniques. For example, the glove must be positioned appropriately on the fingers to function properly, and it does not fit all hands. In use, the glove sometimes registers spurious contact/release events, and one or two threads on the glove occasionally miss input, due to bending strain on the connections. These issues play a role in limiting performance in all the tasks described below.

We carried out an experiment involving four tasks, with 11 participants, all unpaid volunteers. Participants ranged in age from 21 to 33. Two were female, nine male. All were right-handed, with vision corrected to 20/20, and use computers daily. The total duration for a session was about 30 minutes per participant. Each participant first put on a non-latex insulating glove and then the haptic glove. Tasks were carried out in the same order for all participants. Between tasks, participants were allowed to rest for up to two minutes.

Figure 5:
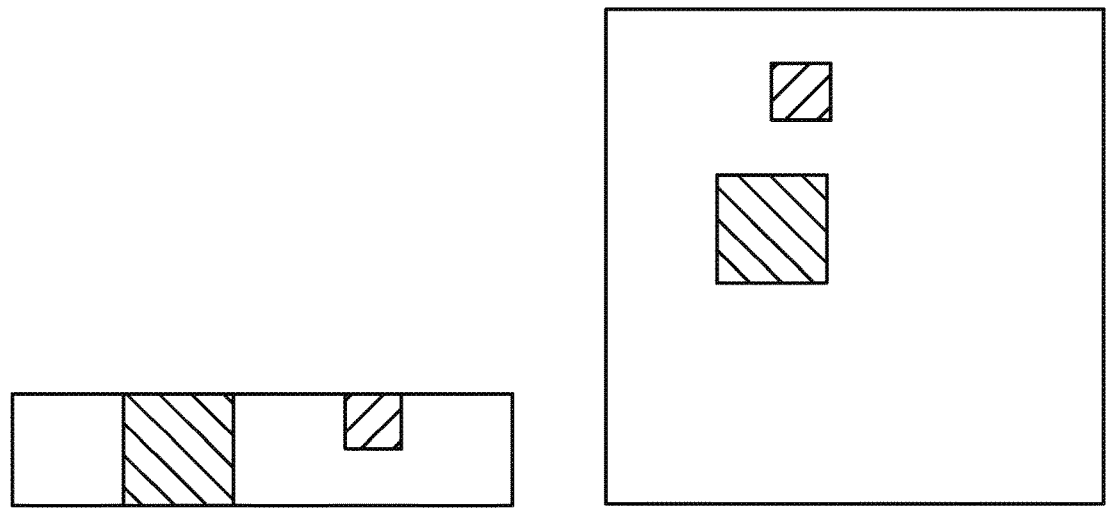
FIG. 5 illustrates a target selection configuration in one and two dimensions.

Tasks 1a and 1b: Indicating spatial location (Part 1). Task 1 was a target selection task in one (Task 1a) or two (Task 1b) dimensions. Task 1a was performed before Task 1b. Participants were shown a box containing a colored target region, as in FIG. 5.

The spatial extent of the box is mapped in absolute terms to the layout of sensors on the first two fingers of the glove. In Task 1a, vertical movement is ignored. The box is divided into an array of n×1 elements for Task 1a or n×n elements for Task 1b (the resolution), and the target occupies adjacent elements for Task 1a, s×s elements for Task 1b (the relative target size). These divisions are not visible in the display. The specific values used for n and s are given in Table 1. based on our judgments about the difficulty of the task from the pilot study.

Note that n=30 is an interesting challenge for the glove, which works at a resolution of at most 10 discrete sensor locations in one dimension. Unlike mouse interactions, the mapping from the input space to the output space is one-to-one and onto. That is, we are asking participants to control a space with a higher resolution than that of the input device.

TABLE 1

Resolution (n), target size (s), and target size ratio.

| n | s | Ratio |
| --- | --- | --- |
| 9 | 2 | 0.22 |
| 9 | 4 | 0.44 |
| 30 | 2 | 0.06 |
| 30 | 4 | 0.13 |
| 30 | 8 | 0.26 |

For Task 1a and then for Task 1b, the participant carried out 24 trials in a training phase. Participants then carried out 10 trials for each of the conditions in Table 1, with target locations generated at random by the system. A trial began with the participant's thumb moving freely, not in contact with the sensors on the fingers. A target appeared in a random location, and the participant touched the thumb to the fingers, causing a cursor to appear. The participant's goal was for the cursor to overlap the target. If this did not happen on the initial touch, the participant slid the cursor by rubbing with the thumb until the target was reached. The participant released contact with the thumb to indicate completion of the trial, and the next trial began immediately. For each trial, the duration was recorded between the release event at the end of one trial and the release event of the next trial; the time for a new target to appear was considered negligible. A trial was considered successful if the release event occurred with the cursor over the target.

Figure 6:
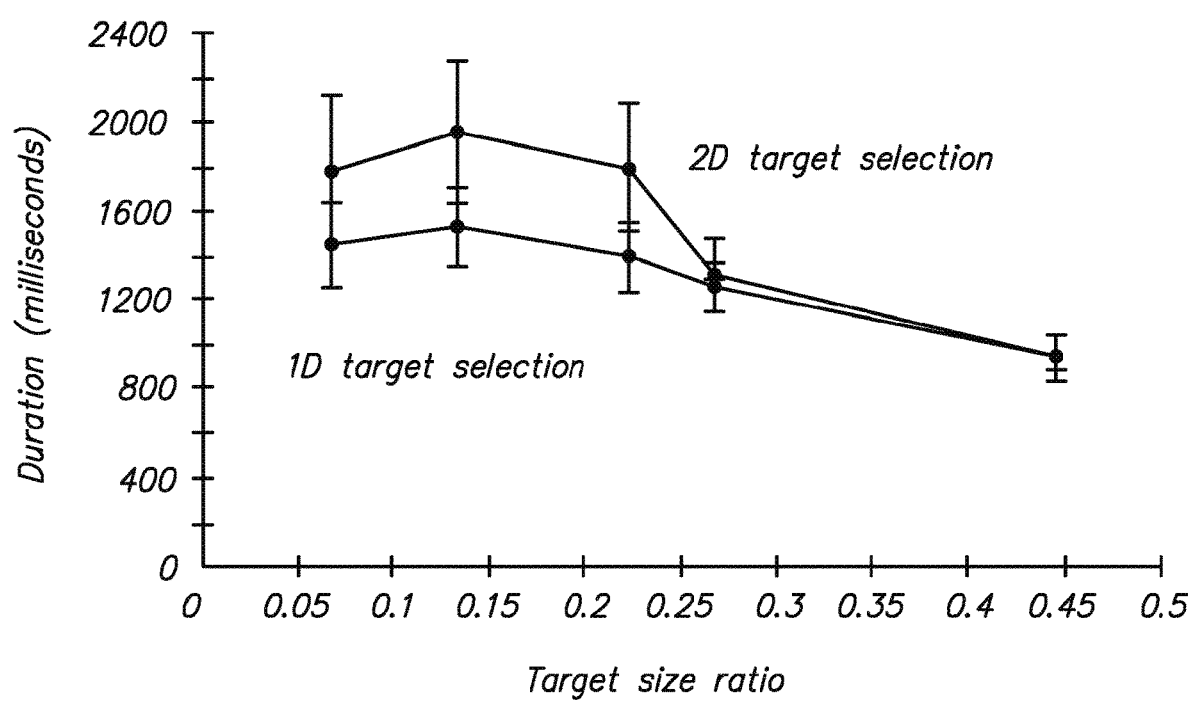
FIG. 6 illustrates a plot of task 1 a/b selection duration, per target size ratio.
Figure 7:
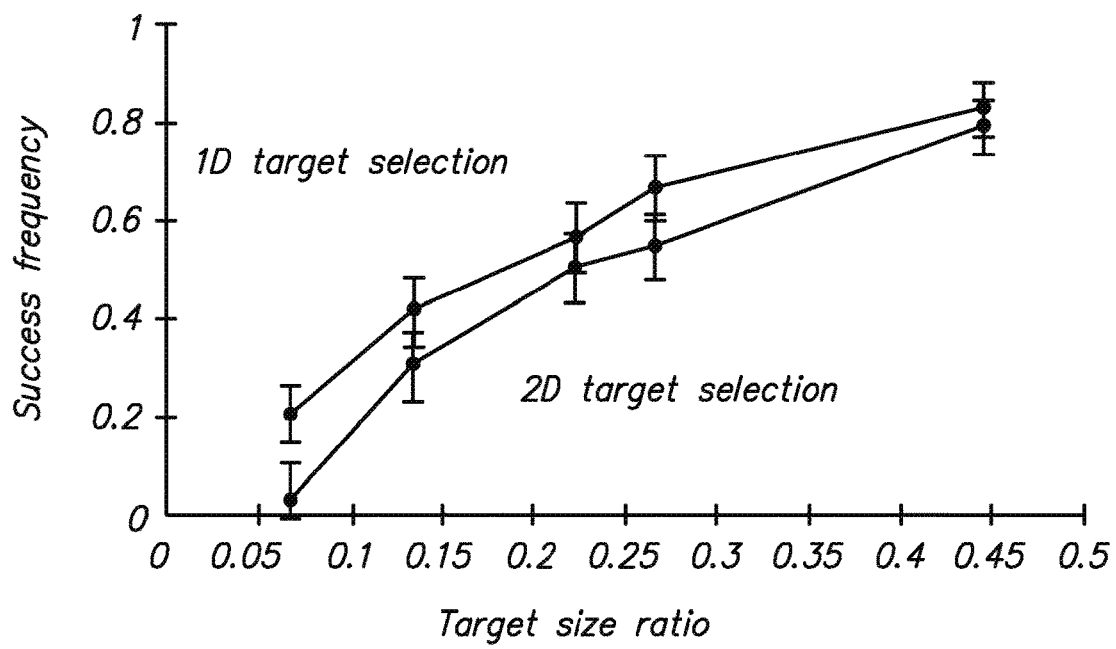
FIG. 7 illustrates a plot of task 1 a/b success frequency, per target size ratio.

Some data cleaning was performed to remove outliers with durations longer than 10 seconds (less than 1% of the data for Task 1a, less than 2% of the data for Task 1b). Qualitatively, the results were largely as expected. FIG. 6 shows the change in duration of target selection as the target size rain increases. FIG. 7 shows the frequency of successful completion of a trial.

Over all the conditions in Task 1a, the mean duration for target selection was 1326 milliseconds. The fastest condition was a resolution of 9 and a target size of 4 (for a target size ratio of 0.444), with a mean duration of 953 milliseconds. The most successful condition was also 9/4, with a success frequency of 0.82, The lowest success frequency by an individual participant was 0.071, in condition $30^12$: no participant reached a frequency higher than 0.50 for that condition. The highest success frequency by an individual participant was 1.0, reached by seven participants in various conditions (9/4, 30/8, and 30/4).

Task 1b values are comparable: the overall mean was 1562 milliseconds, the best condition (9/4) at 934 milliseconds, with the success frequencies being 0.56 and 0.79, respectively. Eight participants were unable to score higher than 0 in the 30/2 condition; four participants reached a score of 1.0 in the 9/4 condition.

For context, Parbi et al. give duration results for selection of targets on small touchscreens with the thumb, in one-handed use. For targets of average size on small touch screens, selection time is between 1100 and 1200 milliseconds; errors appear in almost 30% of selections. The tasks in their experiments are significantly different from Tasks 1a and 1b, but the comparable timing and error rates (e.g., for the midpoint in FIGS. 6 and 7) suggest that glove interaction is not unreasonably slow. The low success rate of 0.82 for even the best target size ratio, however, is more problematic. As mentioned above, this is attributable to two factors: a high level of noise in the sensing for the glove (ie., spurious release events detected), and the limitations the glove imposes on fine targeting actions.

Task 2: Indicating spatial location (Part 2). Task 2 was designed to test whether Fitts' Law applies to the selection of targets only using rubbing gestures, patterned after MacKenzie and Buxton's study of two-dimensional pointing tasks. The structure of the task was similar to that of Tasks 1a and 1b. with the display functioning as a slider widget. Participants first acquired the indicator of the slider and then, by a rubbing action, dragged it to a specified target location, again releasing the thumb at the end of each trial. Unfortunately, this proved unexpectedly difficult for two reasons. Some of the target locations were so close to the boundaries of the device that they could not be reached with a continuous rubbing action, and the initial acquisition of the slider indicator proved more difficult than we had anticipated. For more than half of the participants, the task quickly became so frustrating that they gave up.

We do not report results for this task; however, its failure under experimental conditions suggests the limitations of the device. The current design, in which input and output are decoupled with respect to resolution and a confirmation action simply involves release of the thumb, is inadequate for interaction with conventional graphical user interfaces. Obvious solutions include confirmation actions that are separate from movement, as in the simulation application of the previous section, but new interaction techniques may be needed. Qualitatively satisfactory results in the robot application, where pie menus and taps were used extensively, indicate those modes of interaction better leverage of the device's capability, as contrasted with the poor performance for other types of pointing operations.

Tasks 3a and 3b: Providing discrete input with finger taps, Task 3a involved participants "playing the scales" on their fingers. After a practice phase of 24 trials, participants executed 50 trials, tapping the first through fourth finger in order, then in reverse order. Only duration was measured for these trials, from one release event to the next. The mean duration per tap was 305 milliseconds.

Task 3b required participants to watch the computer display and follow instructions for which finger to tap. Instructions were presented visually, in the form of four colored squares in a vertical column, each corresponding to a different finger. A trial consisted of one square turning a different color and the participant tapping the appropriate finger. The next trial began immediately thereafter. An error was counted if a participant touched a finger other than the one shown on the display; the participant would repeat the trial with the correct gesture. In a practice phase, participants executed 24 trials using the interface, and then carried out SO trials for the task, in which the finger to tap was determined randomly. Duration and success (correct taps) were recorded.

Figure 8:
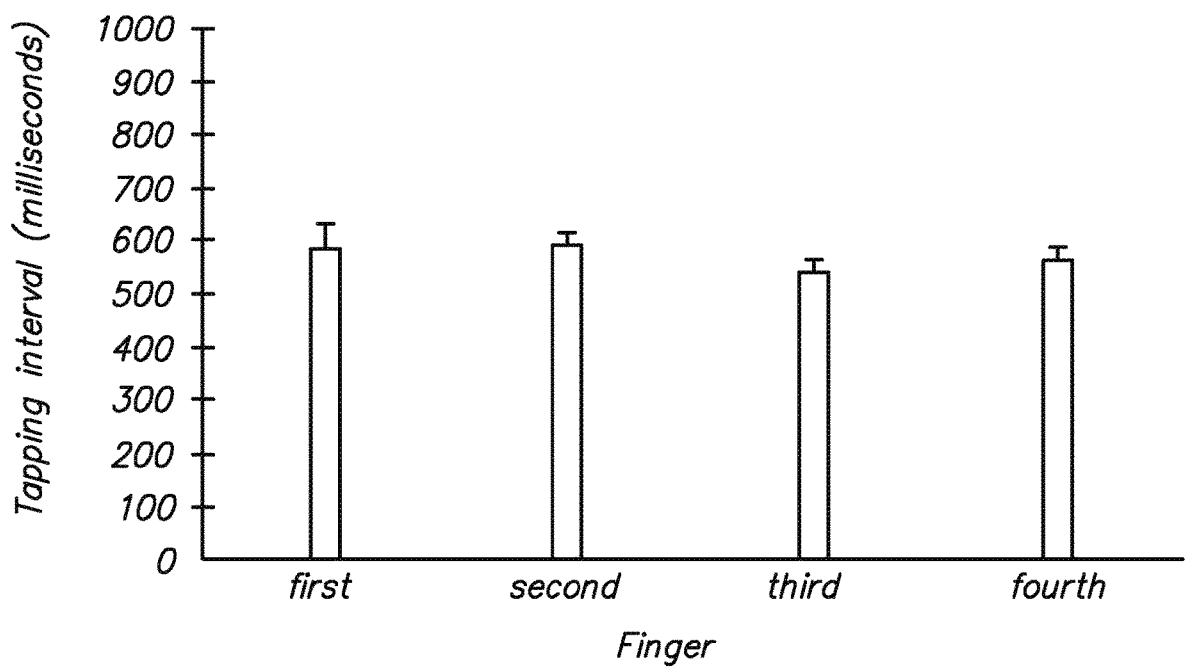
FIG. 8 illustrates a plot of task 3b tap interval, per finger.
Figure 9:
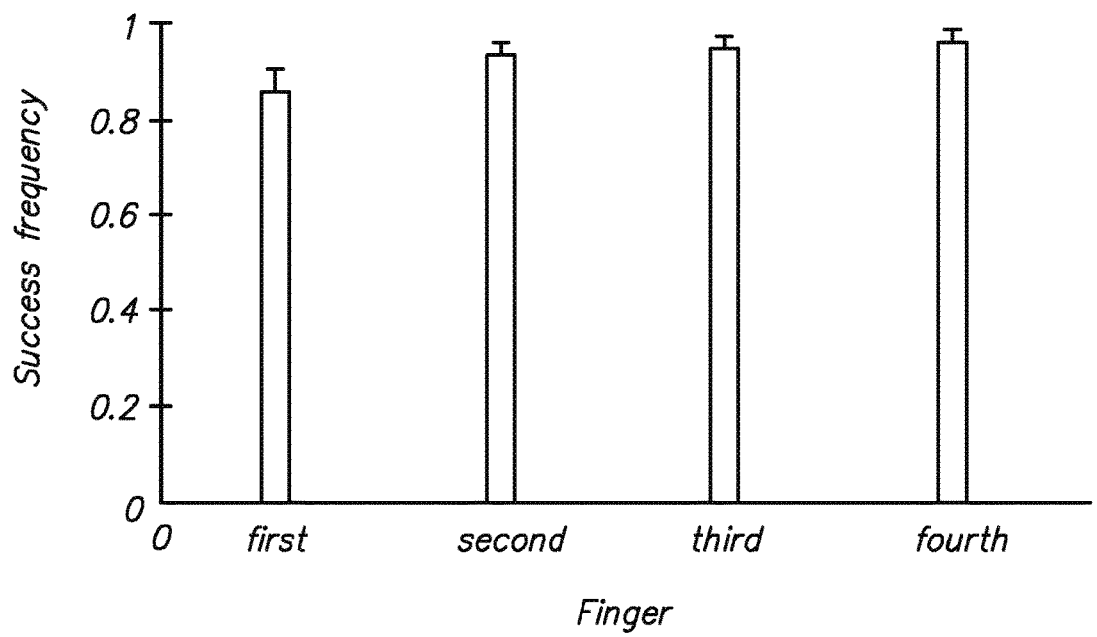
FIG. 9 illustrates a plot of task 3b success frequency, per finger.

Two outlier trials were removed before the analysis was carried out. FIGS. 8 and 9 show the duration and success frequency per finger. The mean over all fingers was 575 milliseconds, with a success frequency of 0.93. The higher duration and lower accuracy of tapping the first finger (The index finger) goes against expectations; we believe it should be attributed to the glove hardware and input processing. These durations are in the expected range for the glove, comparable to performance on the chording glove, though error rates appear to be higher.

Figure 10:
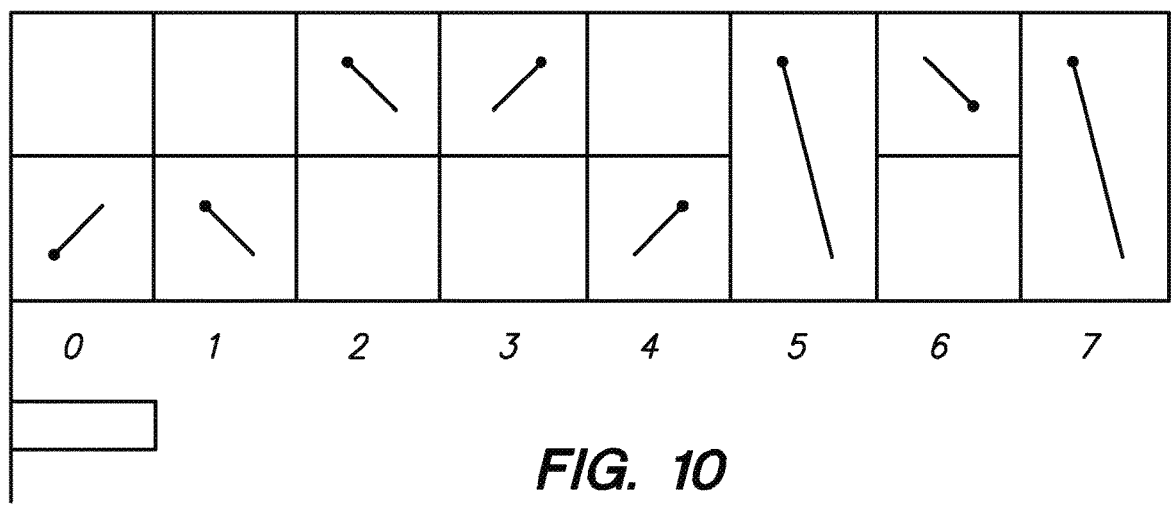
FIG. 10 illustrates a table of symbol rub gestures.

Task 4: Providing discrete input with directional rubbing. Task 4 is a gesture entry task, analogous to text entry tasks in which participants enter gestures using an input device, following a sequence provided on a computer display. All gestures in Task 4 are symbol rubs, as described above, single strokes in a diagonal direction. A sampling is shown in FIG. 10. The direction of the line segment indicates the direction of the gesture, and the red dot indicates the starting point. The upper box indicates a − symbol rub on the first finger, the lower box on the second finger; a tall vertical box indicates a symbol rub across across both fingers. (Note that in this task, participants are not asked to remember the mapping of gestures to symbols, which means that timing and errors are due to the text copying process rather than memory.)

A set of trials began when the participant tapped the thumb to the fourth finger; participants carried out the sequence of gestures displayed. A blue cursor advances through the displayed gestures as they are carried out. On reaching the end of a sequence, participants tapped the fourth finger to advance to the next sequence.

Participants carried out 24 trials to practice the gestures. During the practice phase, a simple gesture recognition system provided visual guidance as to the accuracy of the executed gesture. Gesture recognition was turned off for the trials that followed, because we believed that this would provide for more realistic estimates of the speed of gesture entry in practice, and because of the unreliability of input processing. After the practice phase, participants carried out 50 gestures, following a randomized sequence, broken up into sets of 8, as shown in FIG. 10.

Figure 11:
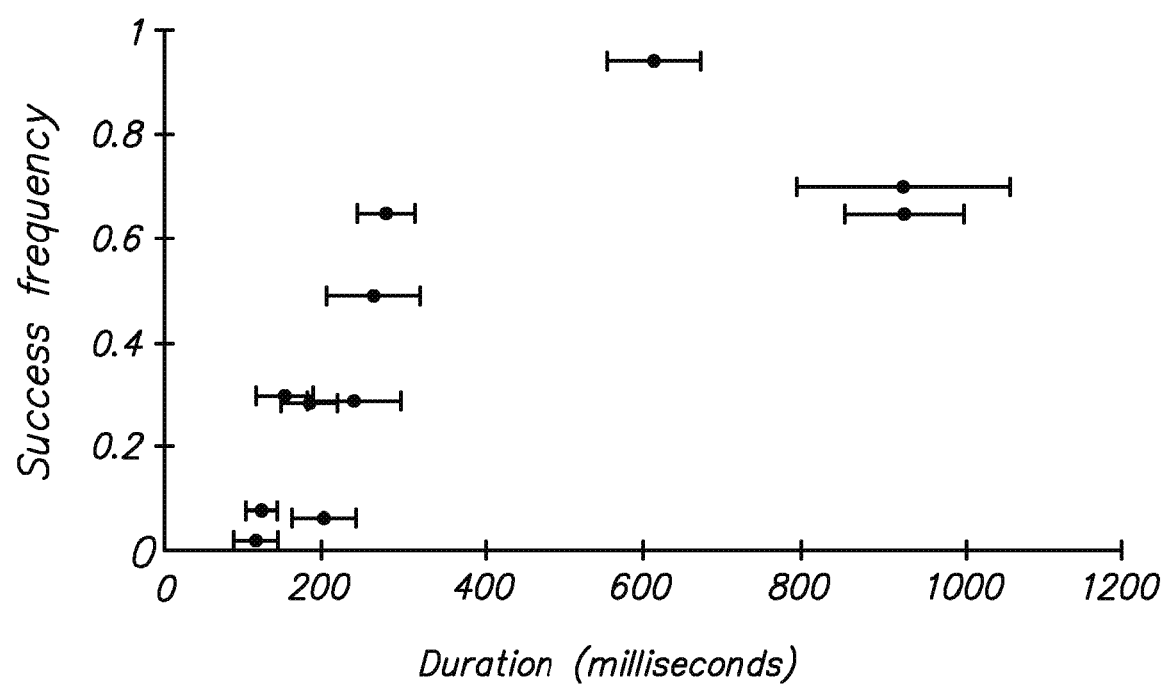
FIG. 11 illustrates a plot of task 4 duration and success frequency, per participant in an experiment.

The mean duration of a gesture in Task 4 was 364 milliseconds, and the success frequency (i.e., recognition rate) was just 0.40. The relationship between duration and recognition rate is show in FIG. 11. The lowest success frequencies per participant (0.02, 0.06. and 0.08) are associated with gesture durations of 200 milliseconds or less. The highest success frequency, 0.94 for one participant, was associated with a mean duration of 614 milliseconds per gesture. The mean 40% recognition rate is clearly far too low for practical use of the glove in this task. Based on our observations of the tests, it seems possible the low recognition rate may be partially due to the horizontal data lines that intermittently fail; noise in the form of spurious release events also played a role. A less noisy glove my improve results.

Contrary to our expectations, performance for target selection (Tasks 1a and 1b) and symbol input (Task 4) was surprisingly low. Worse, a mouse-style pointing task had such low performance that the task could not be completed. We partly attribute this to the glove's noisy capture of the user input.

Despite the disappointing overall results of our experiment, we find a few bright spots: a few participants, in a few tasks, achieved reasonable performance. The authors of this paper, with more experience using the glove, significantly outperform the best of the participants in the experiment: as in other glove-based work, training plays a factor in performance.

The simulated robot application, in contrast, worked much better. Failed inputs had low cost-actions could be repeated—and users found navigating to icons using a pie-menu interaction, menu selections with 1D scrolling, driving and flying the robots with joystick interactions, and shifting interface modes or confirming selection with taps, to all be highly effective, easy to learn, and not frustrating. This suggests that gloves that use a "touchpad on the finger" may have relevance for specific application domains and interaction styles, in particular those relevant to interaction when the user's hand might be out of view. We believe that with better hardware, the glove should offer an interesting new avenue for interaction in wearable computing.

Other related variations may include the following:

- Alternative sensing technology for the glove, such as circuitry printed on the fabric of the glove or fabric-based rheostats.
- Refinements based upon Human performance experiments. For example, by estimating the number of distinct locations users can distinguish when tapping or rubbing along the length of their fingers, the system may be optimized. Task 1 offers no more than a rough approximation of the ability to select different targets.
- Expansion of the gesture set for symbol rubs, such as for text entry by glove gestures. In one variation the system is configured to carry out distinct, single-stroke gestures with the thumb on the surface of the first two fingers without wearing a glove. Such easy, natural movements may be brought to glove-based interaction.
- Enhanced expressiveness in HCI by virtue of the use of the hand in concert with the glove, such as in a variation wherein a glove master input device is utilized to generate music, such as by a hand-held harmonica instrument.

Implementation Example—Virtual Environment Simulation #2

The goal of one implementation is the design and prototype of a human-centric user interface for a team of semi-autonomous robots. The system uses the subject hand-worn, tactile-gesture input device, with feedback and system state provided to the user through a heads-mounted display (HMD).

Data entry into electronic devices during walking or other activities is quite difficult with current interfaces (cell phones, laptops, and tablets). One primary motivation for the subject glove-based master input device configuration was to produce a one-handed device capable of interacting with a synthetic display while its user is walking, looking around, or otherwise engaged. For a multi-robot scenario, one logical choice of display device is a head mounted display (HMD). Many such devices exist, but none to the specifications suggested by the storyline described below, and for this reason, we simulate the graphics that would appear in a HMD using a video game engine and a custom software program implemented in LabView®, available from National Instruments, Inc.

One main input to this system is a hand-worn controller, which enables tactile interaction with the system interface and is capable of capturing various user input gestures, which act as commands to our system's interface. The glove consists of 2D digital data channels connected by a combination of conductive threads and wires. A digital to analog converter (DAC) is then used to capture the digital input. The display consists of "live" video feeds from a set of robots—a "Crawler" and a "Flyer", robot functions, and maps showing the location and sensor data of the robots in the three-dimensional virtual environment.

We have fabricated the hand controller using a glove, with sewn-in electrical contacts using conductive wires to facilitate the capture of user gestures. Drivers written in LabVIEW® allow us to transform the hand motions into commands to the system. For this sample implementation, we chose to simulate the environment and robots using the Unity game engine. The display handles multiple video streams, and allow the user to manipulate/move them as well send commands to his/her robot swarm via hand controls parsed by LabVIEW.

Due to reliability and communications issues associated with modern robots, multi-robot controllers currently available on the market are focused heavily on reporting of status and collection of data rather than the interaction between the user and his/her swarm of robots. This also requires them to be run primarily on large displays or laptops connected to large radios or other communication devices. For our design we have attempted to create an ideal interface for a user in the field to be able to control multiple robots while still moving freely and focusing on other tasks.

The inventive glove differs from other known glove-interaction devices, none of which combine the range of interactions described below or incorporate a 2D touchpad as the subject glove system does. Using the subject glove-based interface, our multi-robot controller will differ from others on the market in its ability to be worn, its ability to be controlled via finger gestures, and its ability to utilize a HMD as its primary display.

Current multi-robot controllers are laptop based and are focused on communication and status rather than user interaction. Hence, we emphasize on following goals:

Allow a user to utilize multiple robots efficiently and effectively while still participating in other tasks.

Design an interface that allows a user approximately 90% of his or her time for daily activities, with instant context shifting to "conduct" the activities of a collection of robots in the other approximately 10% of his or her time.

To accomplish the above said goals, the subject interface is configured to be worn as eyeglasses and a glove. In one configuration, there are three components to the interface: a head mounted display (HMD), a glove that senses touch between multiple fingers, and a software package that displays information from robots. The robots are themselves simulated in a virtual computer game world. One is a "flyer" the other is a "crawler." Both have simple behaviors common to commercial/military robots, though our main focus in this example is not the behavior of the robots but the interaction of the user controlling them.

In practice, the user wears the HMD, which is functionally transparent to the user most of the time. When a robot needs help, the HMD may be configured to play the robot's voice calling for help. The glove may be configured to capture aspects of a user hand motion, and specific gestures bring up information on the HMD. The HMD can operate in "augmented reality mode" (overlaying transparent objects on the user's view of the world), or in "opaque mode", where it shuts out the real world and displays computer generated data, video streams from the flyer and crawler, etc. The simulated display using Unity game engine and LabVIEW is the main interface of our system in this example.

Figure 12:
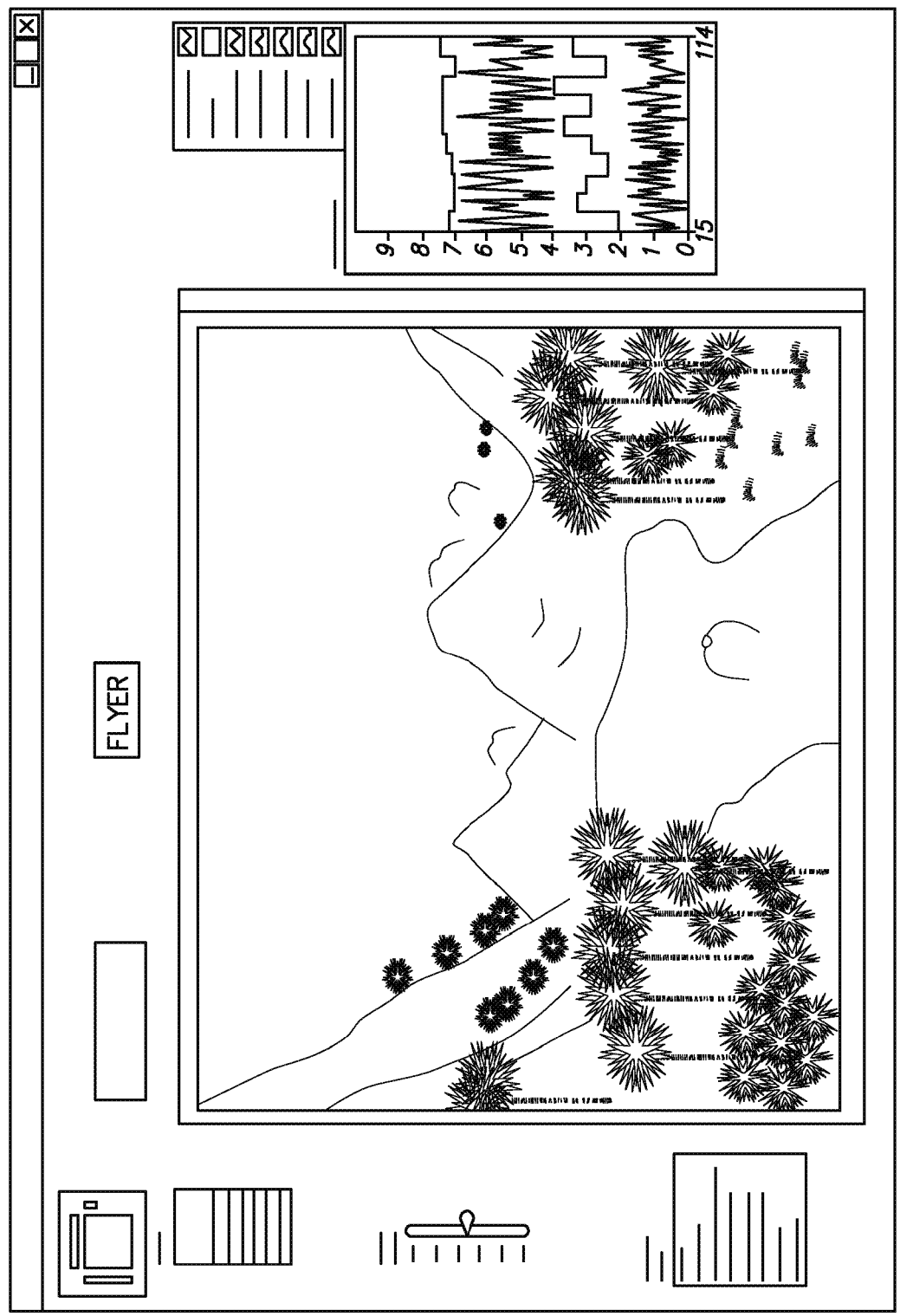
FIG. 12 illustrates a sample view of head-mounted display in "flyer" view during "manual fly" mode.

FIG. 12 illustrates a sample view of a head mounted display ("HMD") in a "flyer" view during a manual "fly" mode.

The glove is a unique part of the interface configuration. Other gloves designed for master input device functionality gather input from either bend sensors or discrete buttons, both of which are deficient for many real-world applications. The subject glove incorporates/improves the functionality of these devices, and has a 2D grid on the index and middle finger that acts as a touch pad. The grid may comprise conductive threads that connect to a data acquisition card. The thumb may be covered in conductive fabric which is grounded: when it touches the threads, a circuit is completed. As the threads do not touch each other, the two-dimensional extent of the thumb's touch may be captured by reading the horizontal and vertical threads, and composing them into a matrix.

The glove uses various different gestures to capture user inputs, such as one-finger clicks-touch, single clicks, double clicks, triple clicks, etc.

In one variation, solid patches of the glove may be made of conductive cloth, with the thumb attached to a ground. By touching a finger to the thumb, a circuit is closed and our system registers a touch by a specific finger. In addition to this functionality, the system also registers double/triple touches.

In addition to single finger clicks, the subject system may be configured to detect multi-finger clicks. In addition to the 4-finger click shown in FIG. 1D, the system may be configured to detect any combination of the 4 fingers touching the thumb.

Figure 1B:
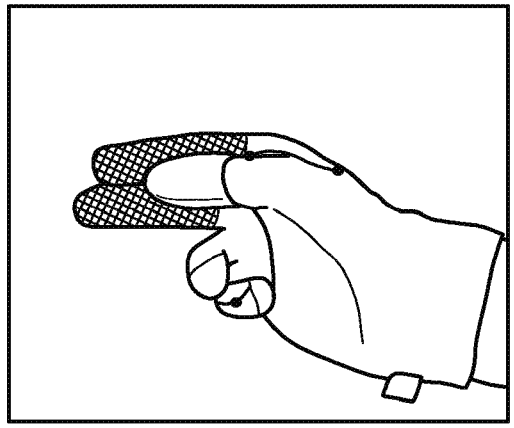
Figure 1C:
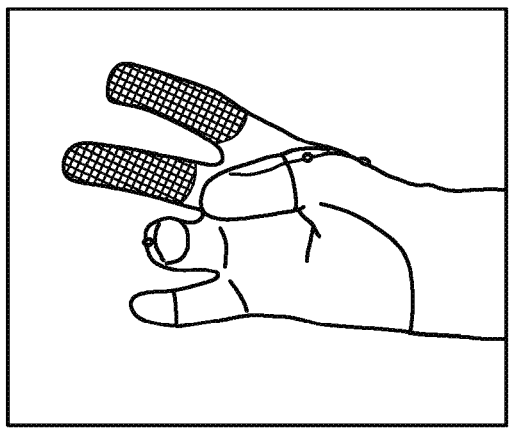
Figure 1D:
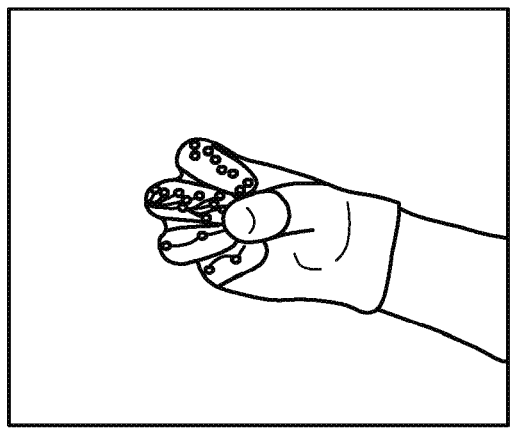

The inventive glove features a 1-dimensional touchpad along the index and middle finger in one variation, and may be configured to function as a two-dimensional touchpad when the index and third fingers are held together, as shown in FIG. 1B. In such variation, the grid itself may comprise 10×8 threads, but as is described in further detail below, by utilizing techniques common in computer vision, we are able to greatly increase the accuracy and resolution.

Given an established and acceptable variety of inputs, we have focused on how to use them to produce usable, intuitive interactions. Due to the vast number of possible interactions supported by the subject glove, it may be important to try and limit supported interactions to only the most intuitive/important for a chosen task domain. Such interactions may then be refined through various techniques such as paper prototyping and/or personas (discussed in more detail below).

For the single and multi-finger touches, in one variation we may choose to interpret them as clicks of a button, allowing the user to select items or trigger transition switches. For consistency, in one variation we have attempted to use the ring finger to serve as the select/confirm input for all selections and dialogs, while the pinky finger serves as the cancel/back input. We also have mapped a 4 finger touch as the action to return an operator to a "home" configuration from any state in the system.

A one-dimensional touchpad configuration lends itself naturally to actions in the user interface such as scrolling lists, adjusting sliders, and panning a camera in one plane, and such implementations are utilized in one variation of the system. The two-dimensional touchpad configuration may require more careful design and consideration of what actions should be supported. One considered task was how to select content on the screen. In one variation, one option discarded after paper prototyping was to utilize the touchpad as it is used on a laptop, and simply have users control a pointer to select items. While easily implementable with our architecture, such configuration may not improve on the existing laptop model of control, and may not provide the type of intuitive interaction that is a design objective. In one configuration it has been decided to model the HMD as a large pie/radial menu. Instead of controlling a cursor, the user must simply move his/her thumb toward the region of the screen that houses the desired item. To provide feedback and avoid unintended selections, the system may be configured to highlight the selected object, and the user may confirm the selection with a simple click of the ring finger.

In one variation, another interaction objective is to utilize the 2D touchpad as a joystick. To accomplish this a small "deadzone" may be created around where the thumb contacts the grid, and modes may be created to allow the user to fly or drive the robots. In both cases, with experimental subjects operating the system, every user has adapted to this functionality immediately and had no problems driving/flying within seconds.

A sample operational script utilizing such configuration is described below and featured in FIG. 13:

1. Audio queue, "Crawler: I am stuck, please assist."
2. User taps tips of all fingers together to bring up augmented reality view.
3. A diagnostic window appears, semi-transparent in upper corner of HMD (head mounted display), giving a brief status overview,
4. Three taps on ring finger transition HMD to opaque, and shows the crawlers control interface
5. A down-and-left stroke of the thumb on the index and middle finger focus the "Behaviors" box.
6. A tap of the thumb and ring finger enter the behaviors box.
7. Sliding the thumb across the index finger, the user scrolls to the "manual drive" behavior.
8. A tap of thumb and little finger pops out of the behaviors box, putting the robot in the just-selected behavior.
9. An up-and-left stroke of thumb against index and middle finger highlights the drive button.
10. A tap of thumb and ring finger starts manual drive.
11. The thumb's motion on the 2D touchpad formed by the index and middle fingers acts as a joystick, driving the robot.
12. When robot is "unstuck," user performs repeats the above steps to put the crawler into a behavior, then taps all the tips of his fingers together twice to return to augmented reality mode, and turn off the HMD.

The above may seem like a large number of steps, but they can all be executed in mere seconds, because fingers are quite dexterous when interacting with each other, there are no manual pointing operations, and the user never has to look at his hands.

Figure 14:
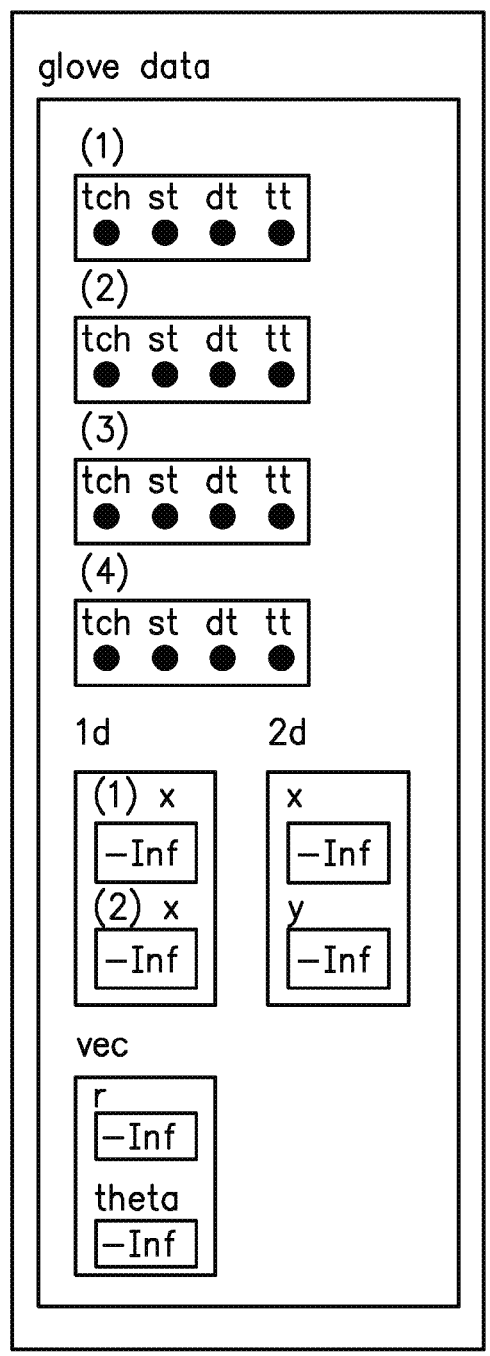
FIG. 14 illustrates one glove data structure configuration.

In terms of software design and implementation in this second exemplary configuration, the 2D touch surface and the individual contacts on the ring and little finger are the only physical parameters brought into the computer, however in software several other data elements are derived. FIG. 14 shows a representation of the data structure the glove software populates. The boxes titled "(1)"-"(4)" are Boolean touch values for the index, middle, ring, and little finger respectively. Each can have a simple touch ("tch"), or single-tap ("st"), double-tap ("dt"), or triple-tap ("tp"). (A traditional mouse click is equivalent to this single tap.) The "1d" object holds 1D (i.e., one-dimensional) x-values indicating the thumb's position along either the index ("(1).x") or middle ("(2).x") finger. The "2d" object is the two-dimensional touchpad mentioned earlier. The "vec" object is a vector of thumb motion: when the thumb first contacts the 2D grid, its position is recorded. As long as the thumb remains in contact with the finger, the thumb's position is calculated as a vector (magnitude "r" and direction "theta") relative to the initial point. This facilitates relative pointing operations.

There are many gloves that implement a form of button presses and taps. One key unique feature of our glove is the 2D touchpad interface on the index and middle fingers. Although the implementation of this touchpad might seem to be error prone (because it is constructed of conductive threads that fray and can short on each other), in actual operation the touchpad is quite robust because of the processing the glove's raw data receives before being sent on.

In one variation thumb position is extracted using an imaging algorithm configured to treat the 8×10 grid of conductive wires as image plane, where each intersection of row and column corresponds to a pixel. Creating the image is a matter of populating a 2D grid, where pixel(i,j)=row(i) AND column(j) (where row( ) and column( ) are Boolean arrays of raw input). The algorithm determines the location of thumb by first removing noise from this "touch image" with a set of filters, then finds the energy centroid of the resultant image. Because imaging filters tend to work best on source data that is smoothly varying, the original 8×10 image is up-sampled using bi-linear interpolation to a 32×32 image. An example of the process from binary image to final centroid s shown in FIGS. 15A-15F.

The steps of the imaging algorithm may be chosen using a heuristics-based algorithm-development method. First, a set of representative images—including significant outliers—may be collected, then using a toolbox of image processing functions, the algorithm designer may select a sequence of functions based on his observations of their effect on the image. The choice of which functions to apply from the hundreds available may be based on designer's experience and intuition. National Instruments Vision Assistant software may be utilized to assist this process in a graphical manner. In one variation, the specific functional steps finalized for this project are given below with their reason for inclusion.

1. Create input image format from binary 10×8, 2D, Boolean array: enables processing using imaging tools.
2. Up-sample using bi-linear interpolation to 32×32 pixel image: puts smooth edges on all regions in the image.
3. Proper-close: removes small noise elements from image without destroying smoothed edges.
4. Local-average filter with a 7×7 kernel (all ones with a zero center element): ramps all gray-scale values in the image, leaving brightest regions in the center of large regions.
5. Exponential look-up table: changes the dynamic range of the image accentuating only the brightest regions.
6. Find the energy centroid of the whole image: this simple method captures the most likely point of user thump contact with the 2D array.

There are dozens of alternate algorithms for establishing where a user's thumb contacts a surface; the above nonlimiting example simply is one that has been implemented with success. Note that the configuration is specifically designed for finding a single point of contact (others are filtered out, as we consider them to be noise). This is of course a software constraint, if the hardware is modified to remove potential short circuits, this algorithm's complexity may be reduced, and simultaneously support multi-touch interactions.

The raw data from the glove may be interpreted into a data structure. An internal triggering structure may monitor the data structure for changes, and push any changes to an event queue. When an event is received, the system may then parse the relevant aspects of the data structure based on the mode of operation and perform the appropriate action. For example, in one variation, if the user is in the main view, the only acceptable commands are a 4 finger touch and a triple tap on either the ring or pinky finger. Although the 20 movement is captured, it does not affect the state of the interface since the command has no meaning in this context.

Figure 16:
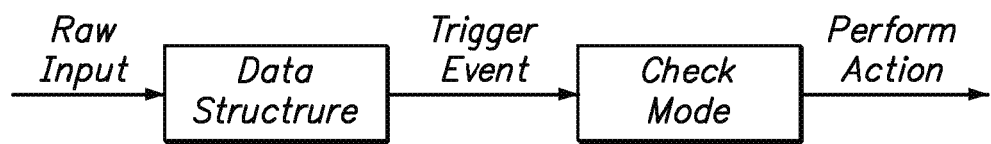
FIG. 16 illustrates one variation of a basic command flow.

FIG. 16 illustrates one variation of a basic command flow.

Figure 17:
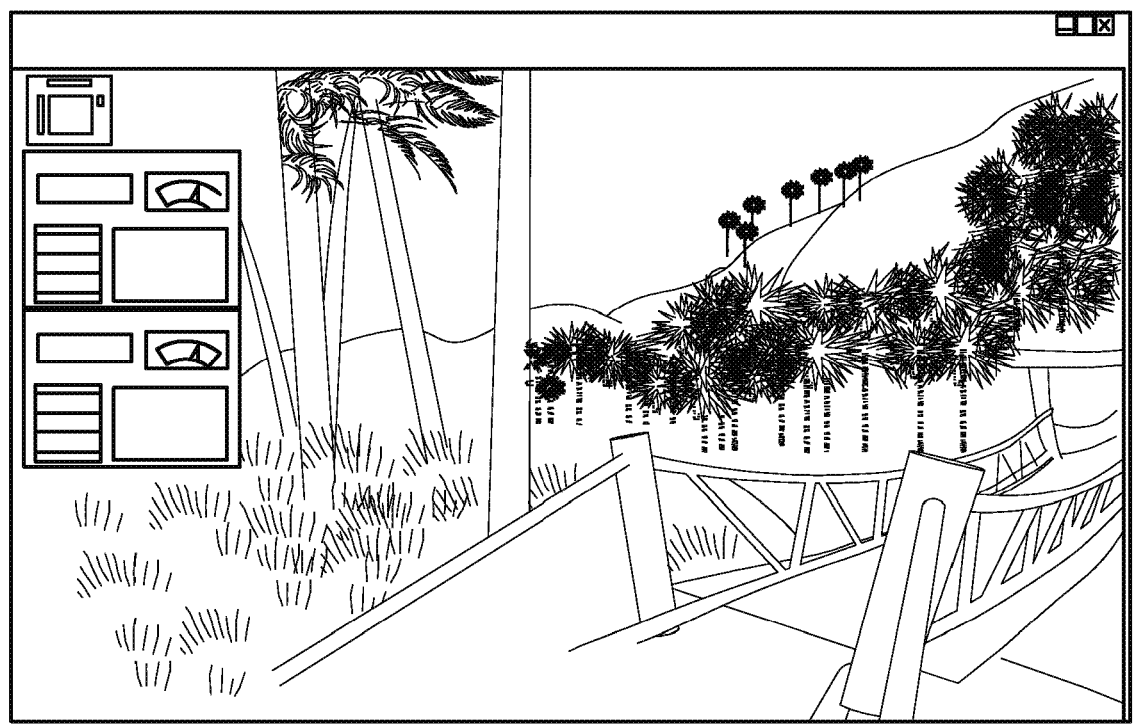
FIG. 17 illustrates one variation of a "main augmented reality view".

In one variation, the system supports multiple modes of operation, with different gestures accepted as input:

A base MAD view has 3 accepted commands. First, the user may toggle the basic "health monitor" displays with a 4 finger touch. A user may also transition to the crawler and flyer views with a triple touch of the ring finger for crawler view, and the little finger for flyer view. FIG. 17 illustrates one variation of a main augmented reality view.

Figure 18:
FIG. 18 illustrates one variation of a crawler view showing a highlighted slider to the center left of the illustration.

A crawler and flyer view overlay a significant amount of information on the screen. The user can select the various control widgets by gesturing with their thumb to the segment of the screen where the widget is located. The currently selected widget is highlighted in green, so that the user has feedback as to which widget they are highlighting. Once the appropriate one is highlighted, the ring and little finger allow the user to enter/exit the widget. FIG. 18 illustrates one variation of a crawler view showing a highlighted slider to the center left of the illustration.

With such configuration, if the user selects the behavior menu or slider, they can scroll through the various values by moving their thumb along the length of their index finger. For driving the vehicles, the user utilizes their thumb on the 2D touchpad as a joystick. To return to the main HMD view, the user simply uses a 4-finger touch.

To interface between a LabVIEW® controller and a Unity® game object, an instance of the Unity web player may be embedded into the LabVIEW interface. To communicate between the two, various inputs from the glove may be mapped to calls to a Windows mouse and keyboard API in a Microsoft Windows operating environment. This allows development of the Unity interface to use only mouse and keyboard inputs, and then control it with the glove by having the 2D touchpad control the mouse when in Manual Drive modes. In one variation, the mouse is overridden in differential mode due to compatibility issues with Unity, but also may be utilized to control it using absolute mode if it would improve the interaction for a given application.

In one variation, upon settling on the concept of a glove and HMO interface, the design concept may be evaluated using a paper modeling session and a physical prototype. Simply sketching out the views the user would see (the first step in the paper prototyping method) may be highly informative, as it may be utilized to turn abstract notions of finger tactile motions into concrete realities, and assist with assessing which finger motions are best mapped to interface actions. Once in a paper prototyping session however, thoughts about the best finger gestures may turn out to be difficult for users to perform. As a direct result of our paper prototyping session, a vector interface may be developed to select various objects in the interface, rather than using a tap-based method to traverse the screen.

In addition to the paper prototype, a physical prototype (a piece of cloth with a conductive thread sewn in a grid) may be created to test the concept of using conductive thread as a touch imager. This may be utilized as a foundation for developing code, and may be fundamental for developing the image-based finger position extraction. It additionally may serve as a prototype for stitching methods.

In practice, usability tests have been conducted with a group of 6 users. Each session started with demonstrating the system, to show the users the different interaction options the glove supports, such as the touchpad on index and middle fingers to control the 2D-motion, the 1D slider to pick items from a list, and the vector input mode for choosing items in the interface, and the various touch-types. Within five minutes all users were reasonably competent in the interface, the only consistent challenge being that they struggled to remember the different fingers combinations for different robot commands. As this is a novel application and users had no familiarity with the command set (and we targeted the application for expert risers}, the level of performance we observed with five minutes of training is exceptional. Adding a one-touch option to display possible finger commands in the current context is a method that may be utilized to increase system learning efficiency. Users have been enamored with the glove's capabilities control robots in three dimensions.

In another variation, wired leads may be converted to wireless communication bridges, as the wires inhibit user motion and therefore glove practicality. Second, the conductive threads (and the wires that attach to them) may be more fragile than is desired, and may be replaced in one variation with conductive ink, or a highly-robust conductive thread, to improve real-world robustness. Finally, for free-motion capture, or joystick-like interactions, gyros and/or accelerometers may be incorporated in the form of one or more inertial measurement units ("IMU" devices) coupled to a portion of the glove, such as the back of the glove.

Various exemplary embodiments of the invention are described herein. Reference is made to these examples in a nonlimiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention described herein may be manufactured and used by or for the United States Government for United States Government purposes without payment of royalties thereon or therefore.

What is claimed is:

1. A system of a hand-worn input device for a human-computer interface, the system comprising:
    a processor;
    a first sensor operatively coupled to the processor and comprising a single conductive sensor, wherein a sensing surface of the single conductive sensor is disposed over a palmar side of a thumb of a hand of a human user wearing the hand-worn input device,
    a second sensor being operatively coupled to the processor and comprising a sensor grid, the sensor grid comprising:
        a first sensor grid over a palmar side of a first or index finger of the hand of the human user, and
        a second sensor grid over a palmar side of a second or middle finger of the hand of the human user,
    the first sensor grid comprising a first plurality of distinctly identifiable sensor grid locations formed by a first plurality of conductive threads disposed across the first or index finger of the hand in a first direction, and a second plurality of conductive threads, electrically isolated from the first plurality of conductive threads, disposed across the first or index finger of the hand in a second direction different than the first direction, wherein the first plurality of distinctly identifiable sensor grid locations of the first sensor grid is defined by respective intersections of respective first and second pluralities of conductive threads,
    the second sensor grid comprising a second plurality of distinctly identifiable sensor grid locations formed by a third plurality of conductive threads disposed across the second or middle finger of the hand in the first direction, and a fourth plurality of conductive threads, electrically isolated from the third plurality of conductive threads, disposed across the second or middle finger of the hand in the second direction, wherein the second plurality of distinctly identifiable sensor grid locations of the second sensor grid is defined by respective intersections of respective conductive threads of respective third and fourth pluralities of conductive threads, wherein
    the first sensor grid and the second sensor grid are independently movable relative to each other in multiple directions and independently movable relative to the first sensor in multiple directions to controllably vary the sensor grid,
    the single conductive sensor of the first sensor comprises a grounded conductive fabric such that when the single conductive sensor of the first sensor contacts a conductive thread of at least one of the first and second sensor grid of the second sensor, a circuit is completed between the first sensor and at least one of the first sensor grid and the second sensor grid of the second sensor, and
    the first sensor and the second sensor are configured to complete the circuit in response to a plurality of thumb—finger interactions comprising a thumb—multi-finger interaction resulting in the thumb contacting or rubbing across the first or index finger and the second or middle finger such that the single conductive sensor of the first sensor contacts at least one conductive thread of the first sensor grid and at least one conductive thread of the second sensor grid.

2. The system of claim 1, the hand-worn input device comprising a glove.

3. The system of claim 1, wherein the first sensor and second sensor are configured to detect the rubbing between the thumb and a combination of adjacently-positioned first or index and second or middle fingers of the hand.

4. The system of claim 1, the plurality of thumb-finger interactions comprising a thumb—single finger interaction resulting in contact or rubbing between the single conductive sensor of the first sensor and at least one conductive thread of the first sensor grid or the second sensor grid individually.

5. The system of claim 4, further comprising a third sensor comprising a single conductive sensor, wherein a sensing surface of the single conductive sensor of the third sensor is disposed over a palmar side of a third or ring finger of the hand, the plurality of thumb-finger interactions comprising a thumb—single finger interaction resulting in contact or rubbing between the single conductive sensor of the first sensor and the single conductive sensor of the third sensor.

6. The system of claim 5, further comprising a fourth sensor comprising a single conductive sensor, wherein a sensing surface of the single conductive sensor of the fourth sensor is disposed over a palmar side of a fourth or pinky finger of the hand, the plurality of thumb-finger interactions comprising a thumb—single finger interaction resulting in contact or rubbing between the single conductive sensor of the first sensor and the single conductive sensor of the fourth sensor.

7. The system of claim 1, wherein the second sensor is divided equally between the first and second sensor grid.

8. The system of claim 1, wherein the first sensor grid and the second sensor grid are independently movable relative to the first sensor over the palmar side of the thumb.

9. The system of claim 1, wherein the circuit is completed when the first sensor grid over the palmar side of the first or index finger is separated from the second sensor grid over the palmar side of the second or middle finger.

10. The system of claim 1, wherein the circuit is completed when the first sensor grid over the palmar side of the first or index finger and the second sensor grid over the palmar side of the second or middle finger are positioned adjacent to each other.

11. The system of claim 1, wherein the first sensor and the second sensor are configured to generate different numbers of distinctly identifiable grid locations.

12. The system of claim 11, wherein a number of distinctly identifiable grid locations can be selectively varied based at least in part upon positioning of the first or index finger and the second or middle finger of the hand of the user.

13. The system of claim 11, the plurality of thumb-finger interactions comprising a thumb—single finger interaction resulting in contact or rubbing between the single conductive sensor of the first sensor and at least one conductive thread of the first sensor grid or the second sensor grid individually, wherein a first number of distinctly identifiable sensor grid locations for the circuit completed based on the thumb-multiple finger interaction is greater than a second number of distinctly identifiable sensor grid locations for a circuit completed based on the thumb-single finger interaction.

14. The system of claim 13, wherein a sensor grid for the circuit completed based on the thumb-multiple finger interaction results from the first or index finger and the second or middle finger being positioned adjacent to each other and is twice as large as a sensor grid used for the circuit completed based on a thumb-single finger manipulation.

15. The system of claim 1, wherein the first sensor and the second sensor are configured to provide two orthogonal dimensions of operational input pertinent to a three-dimensional virtual environment.

16. The system of claim 1, wherein the first sensor and the second sensor are configured to detect rubbing between the thumb and a specific finger in a pen-like function.

17. The system of claim 1, wherein when the single conductive sensor of the first sensor contacts at least one of the first sensor and the second sensor, the processor is configured to generate a bounding box of the sensor grid.

18. The system of claim 17, wherein the processor is configured to calculate a center of the bounding box.

19. The system of claim 1, wherein a resolution of the sensor system is controllably variable by positioning of one or more fingers of the user.

20. The system of claim 19, wherein the resolution of the sensor system is controllably variable based at least in part on positioning of the first or index finger and the second or middle finger adjacent to each other.

\* \* \* \* \*